Aug. 20, 1940.  D. W. SHERMAN  2,212,355
BRAKE AND CLUTCH PEDAL FOR AUTOMOBILES
Filed May 1, 1939
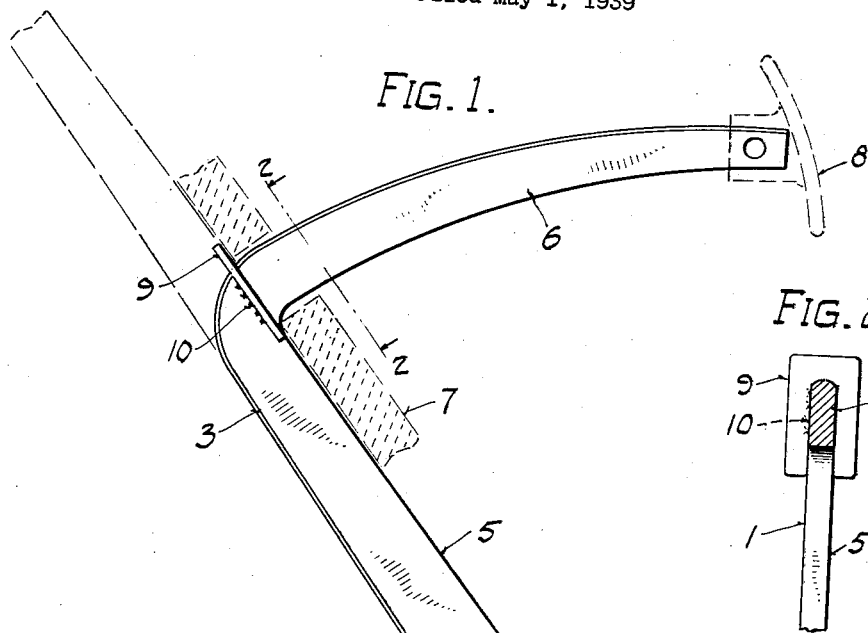
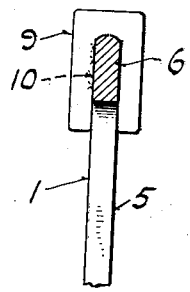
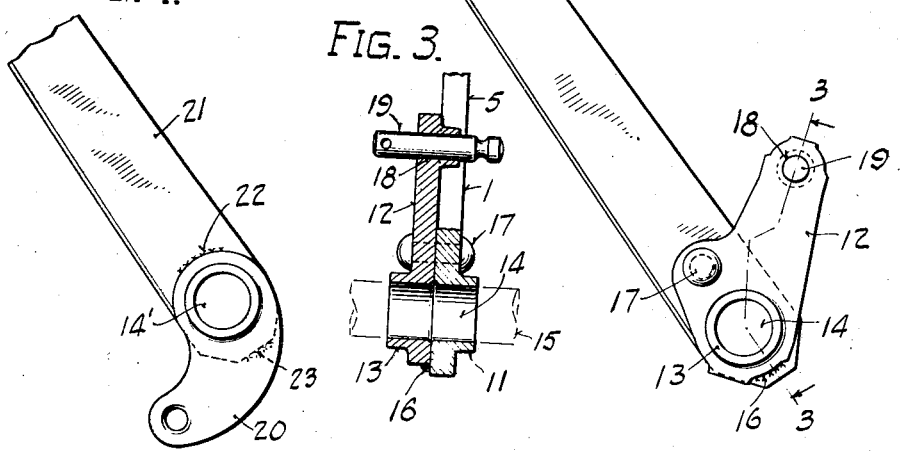
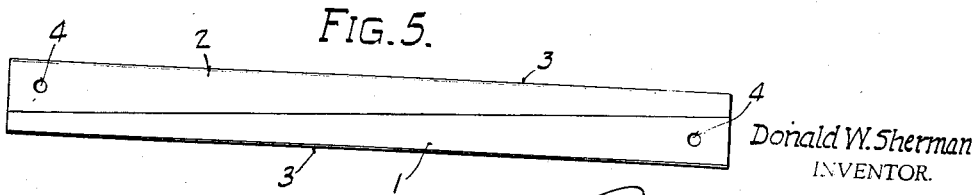
Donald W. Sherman
INVENTOR.
BY
ATTORNEY.

Patented Aug. 20, 1940

2,212,355

UNITED STATES PATENT OFFICE 2,212,355

BRAKE AND CLUTCH PEDAL FOR AUTOMOBILES

Donald W. Sherman, Shorewood, Wis., assignor to A. O. Smith Corporation, Milwaukee, Wis., a corporation of New York Application May 1, 1939, Serial No. 271,099

6 Claims. (Cl. 74—560)

The invention relates to a brake and clutch pedal for automobiles.

The principal objects of the invention are to provide a light weight less costly pedal construction, and to provide a sheet metal pedal of few parts and of efficient design.

Other objects will appear hereinafter in connection with the description and illustration of an embodiment of the invention.

In the drawing:

Figure 1 is a side elevation showing the pedal with a brake lever arm;

Fig. 2 is a transverse section taken above the position of the floor board on line 2—2 of Fig. 1;

Fig. 3 is a transverse section through the lever arm of the pedal on line 3—3 of Fig. 1;

Fig. 4 is a side elevation of the pedal with a clutch lever arm; and

Fig. 5 is a plan view showing the blanking of the main arm of the pedal from sheet metal stock.

The pedal is blanked on a taper, Fig. 5 illustrating two pedal arms 1 and 2 cut from a straight strip of metal having curved edge portions 3 formed as a mill rolled edge. A hole 4 is provided in the large end of each blank.

In making the pedal the blank 1 is bent edgewise as illustrated in Fig. 1 with the curved edge 3 on the outer curvature of the bend to prevent tearing of the metal in the operation. In bent form the blank 1 comprises the upright section 5 and the curved pedal support section 6 which extends through the floor board 7.

A suitable pedal 8 is bolted or otherwise secured to the outer end of the section 6. A small stop 9 of sheet metal cut to receive the blank adjacent the curved portion between sections 5 and 6 is secured to the blank in alignment with the inner edge of section 5 as by welds 10, and serves to limit the outward movement of the pedal and to close any gap between the pedal and floor board or its covering.

The lower end of section 5 of the blank has the hole 4 enlarged to form an integral flange 11 thereon by a process set forth in my United States Letters Patent No. 2,157,354 issuing on May 9, 1939.

The brake lever arm, illustrated in Figs. 1 and 3 comprises a small stamping 12 having a tubular flange 13 positioned in alignment with and complementary to the flange 11. The aligned flanges 11 and 13 form an opening 14 for receiving the supporting shaft 15 upon which the brake pedal pivots.

The stamping 12 has its lower edge preferably out of register with the lower edge of the section 5 to provide a ledge for receiving the weld deposit 16. Above the opening 14 the stamping 12 may be welded at its edge to the arm 5, but it is preferable to rivet the same as at 17.

The upper end of the stamping 12 has a small flanged opening 18, formed in a similar manner to that of flange 13, for receiving a pin 19 which makes a drive fit in the opening and to which the usual brake operating mechanism is attached.

In Fig. 4, the clutch lever arm is shown as formed by a stamping 20 which is curved downwardly from the opening 14'. It is formed in the same manner as the stamping 12, but instead of employing a rivet and a weld to secure it to the pedal arm 21, the stamping is welded to the arm both above and below the opening as at 22 and 23.

The pedal of the present invention can be made much more economically than those heretofore employed, and at the same time stronger and more durable. There is a minimum number of operations in its manufacture.

Various embodiments of the invention may be made within the scope of the objects and of the claims.

The invention is claimed as follows:

1. In a brake or clutch pedal for automobiles, a pedal arm formed from plate metal stock and bent edgewise to provide an upper end portion disposed to pass through the floor board, the lower end of said arm having an opening for receiving the supporting pivotal shaft, and an integral tubular flange formed around said opening and providing an extended bearing for the arm on the shaft, said arm having a flat plate secured to it at the bend and in the plane of the floor board to provide a stop for the pedal and close the gap in the floor board.

2. In a brake or clutch pedal for automobiles, a pedal arm formed from plate metal stock and bent edgewise to provide an upper end portion disposed to pass through the floor board, the lower end of said arm having an opening for receiving the supporting pivotal shaft, and an integral tubular flange formed around said opening and providing an etxended bearing for the arm on the shaft, said arm having a rolled edge on the outer portion of its curvature to facilitate the bending operation.

3. In a brake or clutch pedal for automobiles; a pedal arm formed from plate metal stock and having an embossed opening at its lower end for receiving a pivotal supporting shaft, a second arm having a similarly embossed opening and secured to said first arm back to back with their integrally embossed openings in alignment, said second arm having its outer end free from the pedal arm and provided with means for attaching a member to be operated by the pedal.

4. In a brake or clutch pedal for automobiles; a pedal arm formed from plate metal stock and having an embossed opening at its lower end for receiving a pivotal supporting shaft, a second arm having a similarly embossed opening and secured to said first arm back to back with their integrally embossed openings in alignment, said second arm being blanked from plate metal stock and having an operating pin in tight drive fit in an embossed opening at its outer end.

5. In a brake or clutch pedal for automobiles, a pedal arm formed from plate metal stock and having an embossed opening at its lower end for receiving a supporting member, a second arm formed from plate metal stock and having a similarly embossed opening disposed in alignment with said first named opening and with their embossments providing an extended bearing for the support of the pedal, said second arm having its outer end free from the pedal arm and provided with means for attaching a member to be operated by the pedal, and a weld integrally joining said arms at the lower end edge of said first named arm.

6. In a brake or clutch pedal for automobiles, a pedal arm formed from plate metal stock and having an embossed opening at its lower end for receiving a supporting member, a second arm formed from plate metal stock and having a similarly embossed opening disposed in alignment with said first named opening and with their embossments providing an extended bearing for the support of the pedal, said second arm having its outer end free from the pedal arm and provided with means for attaching a member to be operated by the pedal, a weld integrally joining said arms at the lower end edge of said first named arm, and a rivet securing said arms together above said embossed openings.

DONALD W. SHERMAN.